United States Patent [19]

Whittaker et al.

[11] Patent Number: 5,194,734

[45] Date of Patent: Mar. 16, 1993

[54] APPARATUS AND METHOD FOR INDICATING A CONTOUR OF A SURFACE RELATIVE TO A VEHICLE

[75] Inventors: Thomas F. Whittaker, Colleyville; Robert E. Wallace, Garland, both of Tex.

[73] Assignee: Varo Inc., Garland, Tex.

[21] Appl. No.: 707,853

[22] Filed: May 30, 1991

[51] Int. Cl.[5] .............................................. G01C 7/04
[52] U.S. Cl. ..................................... 250/338.1; 356/1; 356/4; 356/28; 356/376
[58] Field of Search ..................... 250/338.1; 356/1, 4, 356/28, 376

[56] References Cited

U.S. PATENT DOCUMENTS

| | | |
|---|---|---|
| 3,180,205 | 4/1965 | Heppe et al. ............................ 356/1 |
| 3,489,495 | 1/1970 | Blau et al. . |
| 3,603,683 | 9/1971 | Praise et al. . |
| 3,610,821 | 10/1971 | Narbaits-Jaureguy . |
| 3,620,626 | 11/1971 | Daly . |
| 3,693,143 | 9/1972 | Kennedy . |
| 3,721,499 | 3/1973 | Narbaits-Jaureguy . |
| 3,918,172 | 11/1975 | Moreau . |
| 4,130,360 | 12/1978 | Courtenay . |
| 4,277,170 | 7/1981 | Miles . |
| 4,373,805 | 2/1983 | Mallinson .............................. 356/4 |
| 4,600,997 | 7/1986 | Cain et al. ............................ 356/4 |
| 4,836,671 | 6/1989 | Bautista . |
| 4,902,126 | 2/1990 | Koechner . |

Primary Examiner—Carolyn E. Fields
Assistant Examiner—Drew A. Dunn
Attorney, Agent, or Firm—Baker & Botts

[57] ABSTRACT

An apparatus and method for indicating a contour of a surface relative to a vehicle, in which a first electromagnetic radiation source projects a first beam to create a first reflection pattern on the surface. A second electromagnetic radiation source projects a second beam to create a second reflection pattern on the surface. An apparatus is provided for coupling the first and second electromagnetic radiation sources to the vehicle, such that a movement of the vehicle results in a movement of the first and second reflection patterns on the surface.

23 Claims, 7 Drawing Sheets

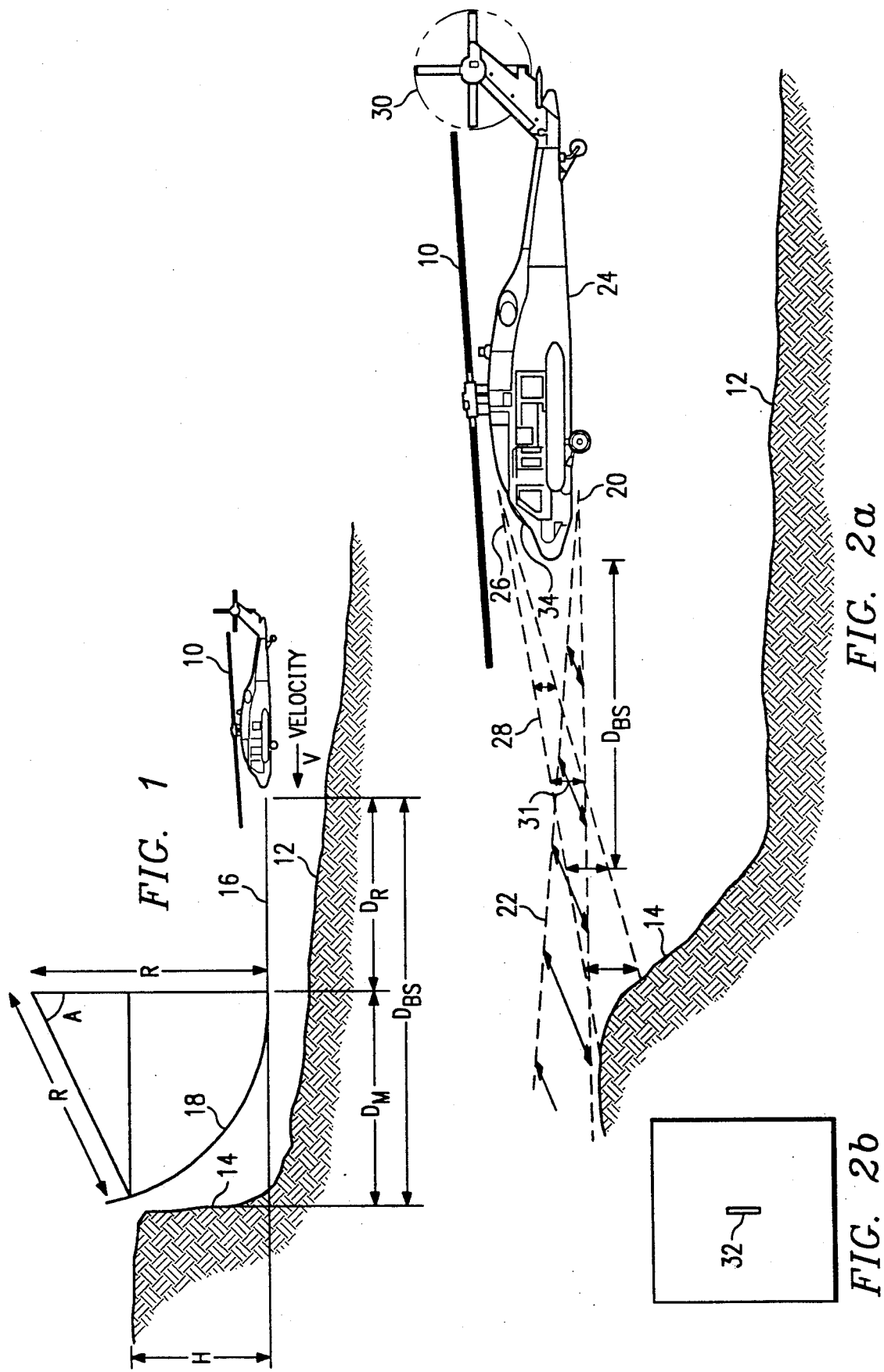

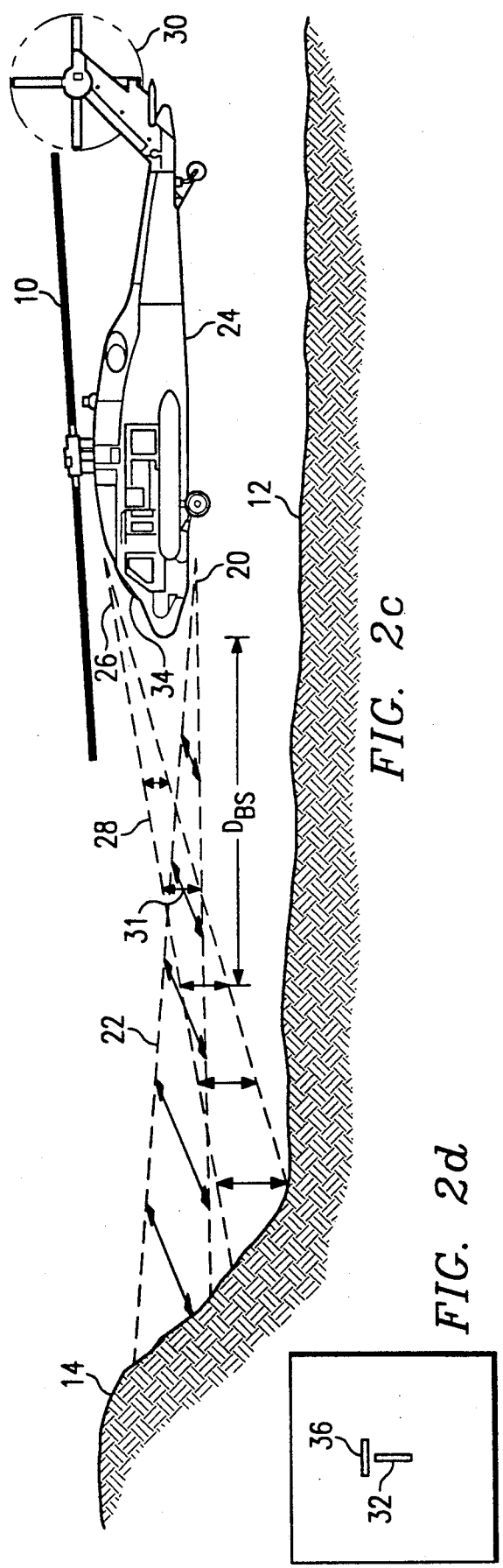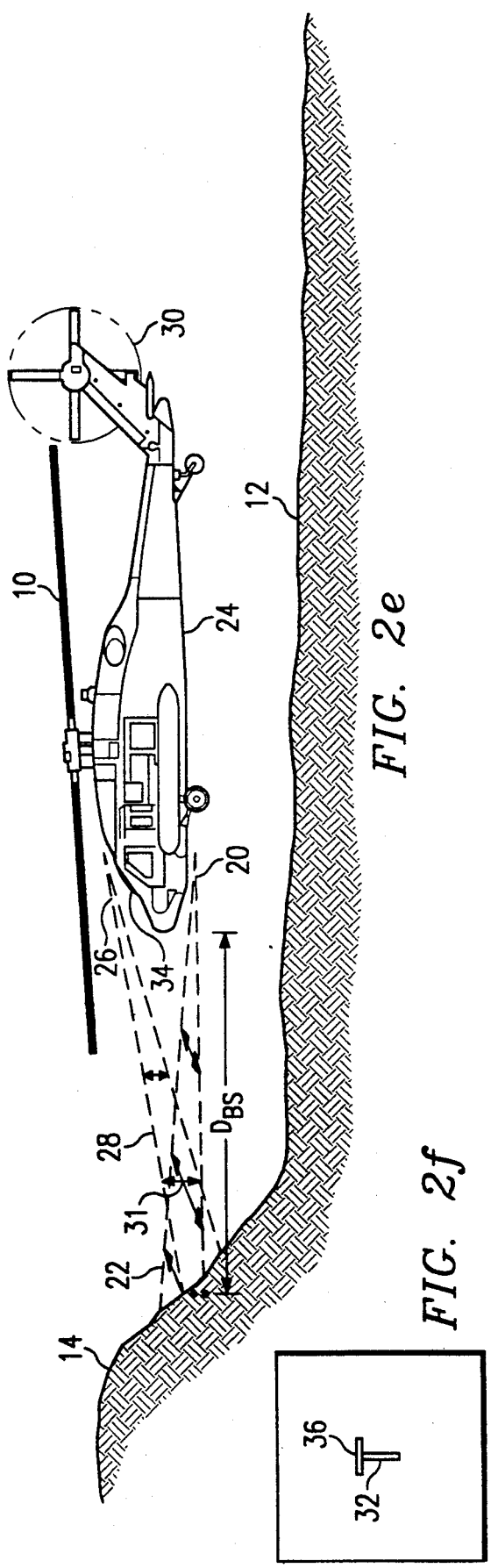

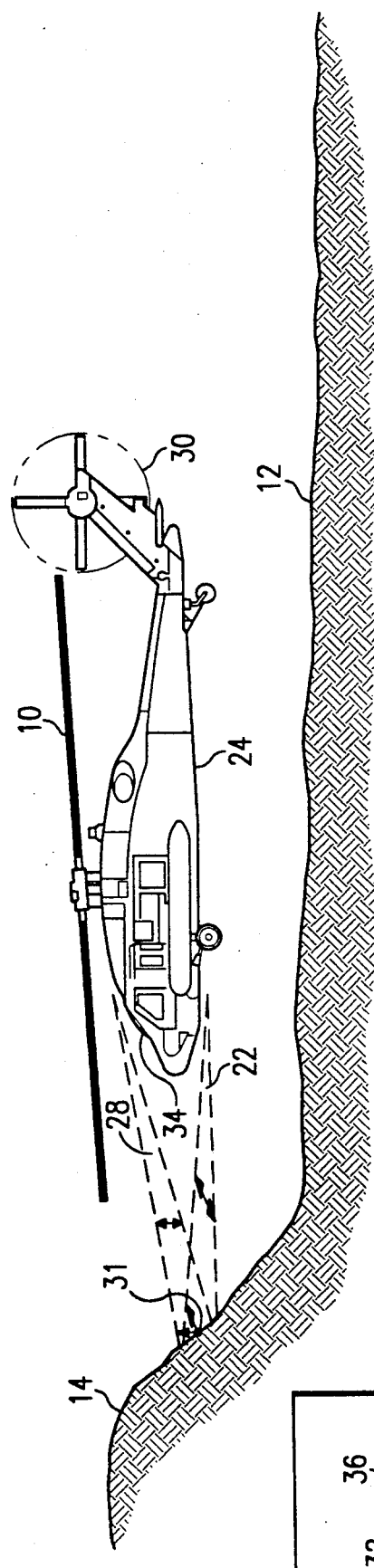
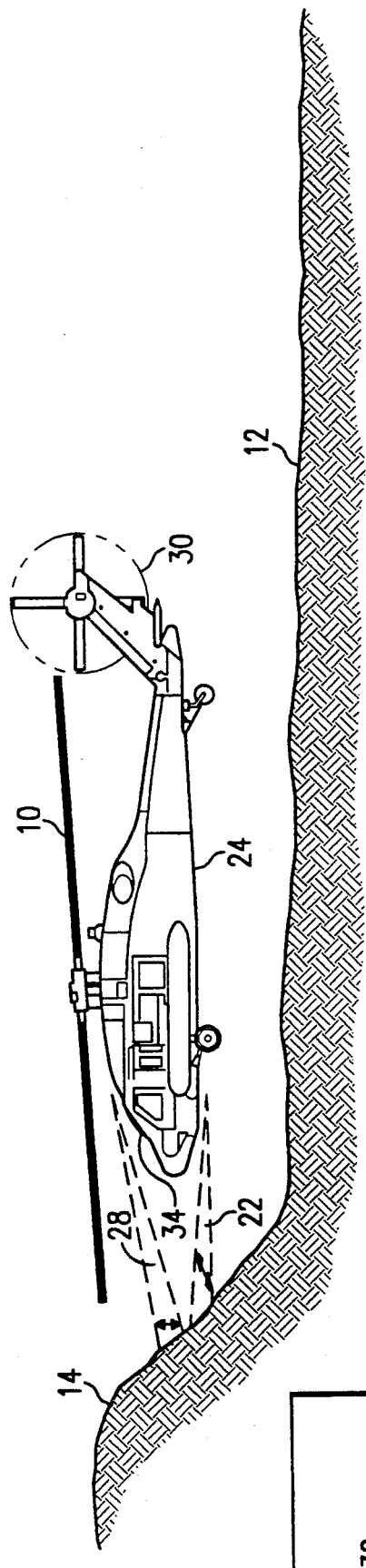

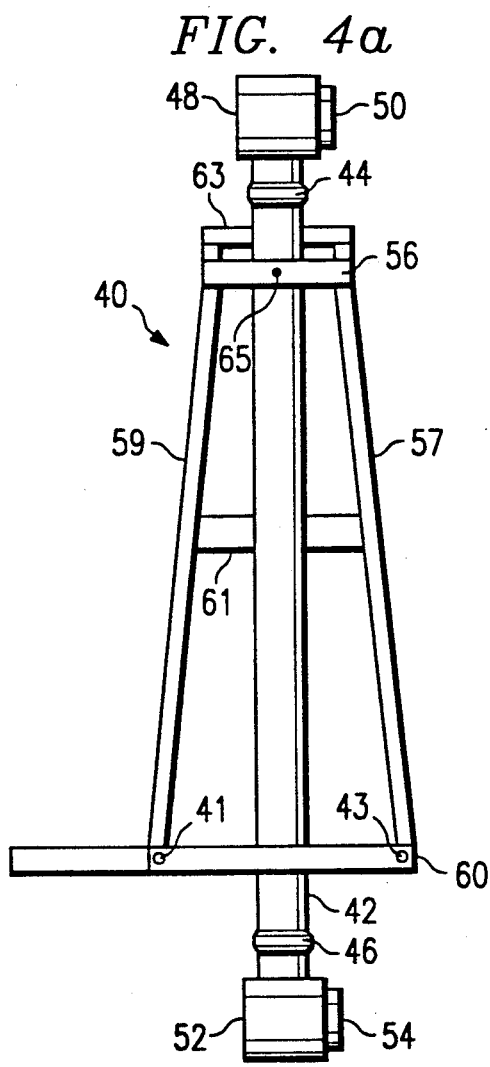
FIG. 4a
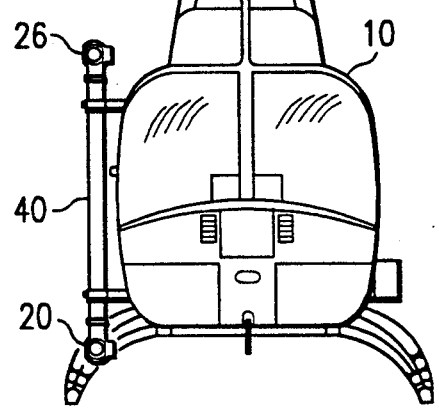
FIG. 3
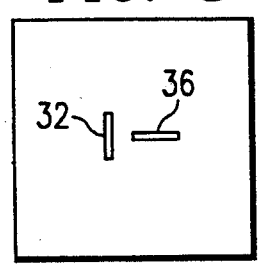
FIG. 8
FIG. 4b

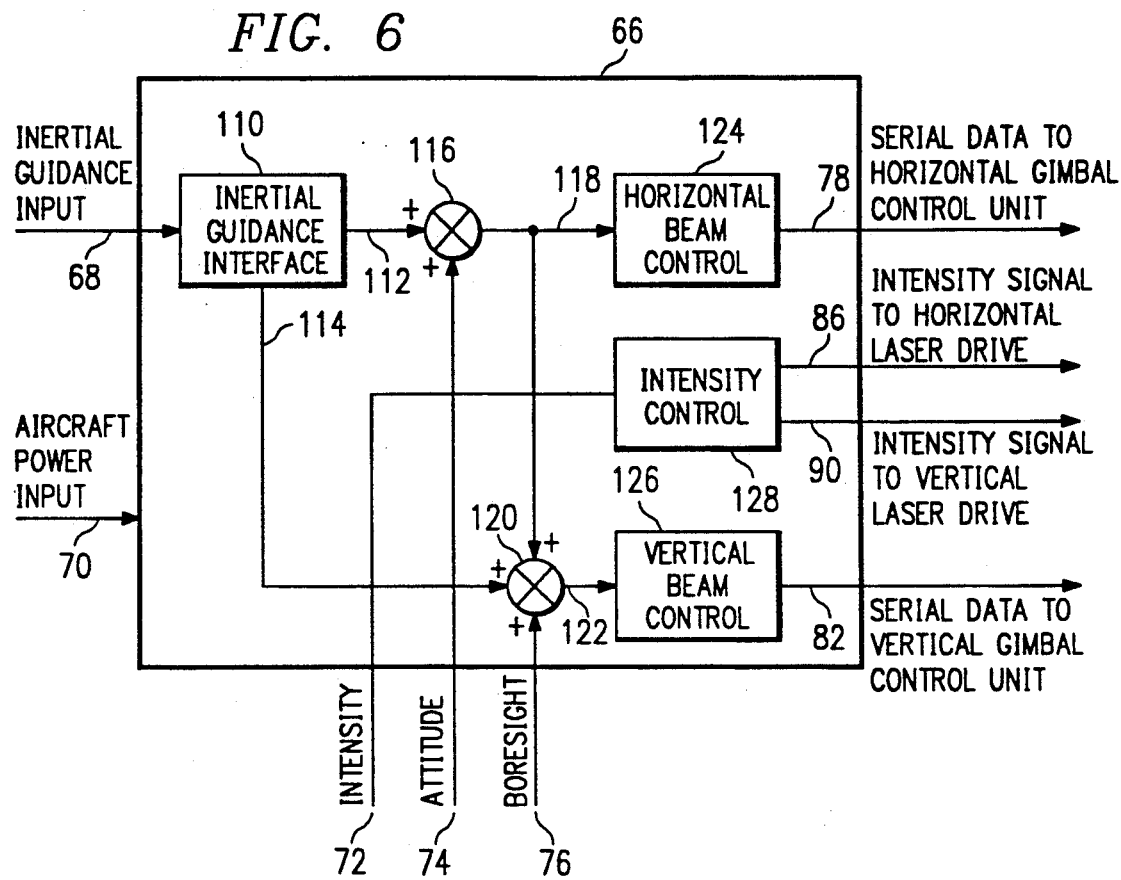
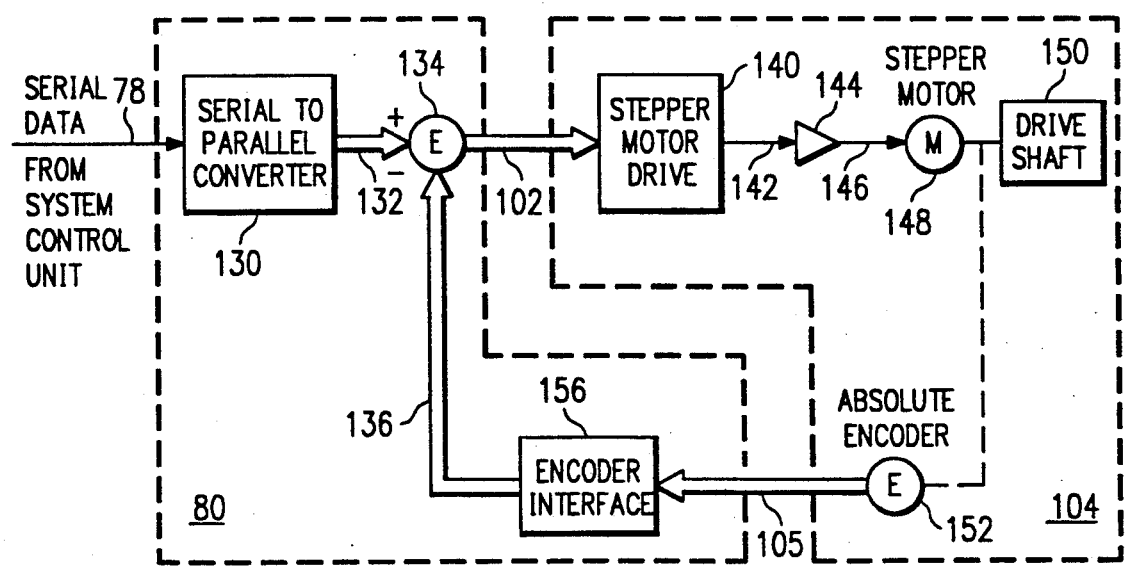

ns,194,734

APPARATUS AND METHOD FOR INDICATING A CONTOUR OF A SURFACE RELATIVE TO A VEHICLE

TECHNICAL FIELD OF THE INVENTION

This invention relates in general to vehicle navigation systems, and more particularly to vehicle navigation systems that utilize electromagnetic radiation beams to provide a reference for a vehicle relative to a surface.

BACKGROUND OF THE INVENTION

Military aircraft, in particular helicopters, frequently fly at extremely low altitudes in order to evade enemy attack. Military helicopters may fly at speeds of over 100 knots, and typically fly for extended periods at speeds of 80 knots. Aircraft flying at low altitudes requires a pilot to judge a contour of the ground's surface or the surface of other objects in order to avoid collisions. The pilot's judgment is usually aided by stereoscopic vision and apparent sizes of surface features. However, featureless terrain, such as desert or water, fails to provide features required to judge a contour of the surface. Intensified night vision goggles, used for flying at night, further diminish stereoscopic vision at distances shorter than 50 ft.

As a result, helicopters often contact the desert soil at high speed. In some cases, the contact is significant enough to crash the aircraft, resulting in loss of human life and equipment. This loss can be particularly tragic in times of conflict, when an entire troop may be relying on air support from the helicopter and its pilot.

Some prior art systems have been developed for judging distances, typically for landing purposes. While these systems provide some distance information to the pilot, they do not provide the pilot with a feel for the contour of the surface. Further, reliance on a display can be very distracting to a pilot who must repeatedly shift his focus from the terrain to the display panel.

Therefore, a need has arisen for an apparatus and method to indicate a contour of a surface relative to a vehicle.

SUMMARY OF THE INVENTION

In accordance with the present invention, an apparatus and method is provided which indicates a contour of a surface relative to a vehicle.

In one aspect of the present invention, a first electromagnetic radiation source projects a first beam to create a first reflection pattern on the surface. A second electromagnetic radiation source projects a second beam to create a second reflection pattern on the surface. An apparatus is provided for coupling the first and second electromagnetic radiation sources to the vehicle, such that a movement of the vehicle results in a movement of the first and second reflection patterns on the surface such that a contour of the surface relative to the vehicle is indicated.

In a second aspect of the invention, an apparatus is provided for adjustably orienting the first and second beams relative to the vehicle responsive to an input by a pilot of the vehicle or to a velocity component of the vehicle.

The present invention provides significant technical advantages. The invention provides a cost-effective, low-maintenance apparatus which may be retrofitted to existing aircraft. The reflection pattern on the surface may be used by the pilot to determine the surface's contour. After a short period of use, guidance of the aircraft using the reflection patterns becomes intuitive; therefore, extensive training is not required.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a side view of a problem addressed by the present invention;

FIGS. 2a-j illustrate perspective views of a helicopter using the present invention and the resulting reflection patterns;

FIG. 3 illustrates a front view of an adjustable supporting apparatus of the present invention coupled to the vehicle;

FIG. 4a illustrates a side view of the adjustable supporting apparatus of the present invention;

FIG. 4b illustrates a front view of the adjustable supporting apparatus of the present invention;

FIG. 6 illustrates a block diagram of the system control unit of an alternative embodiment of the present invention;

FIG. 7 illustrates a block diagram of a gimbal control unit and a gimbal of an alternative embodiment of the present invention;

FIG. 8 illustrates a perspective view of the beam pattern for an alternative embodiment of the present invention.

DETAILED DESCRIPTION OF THE INVENTION

Figure 5:
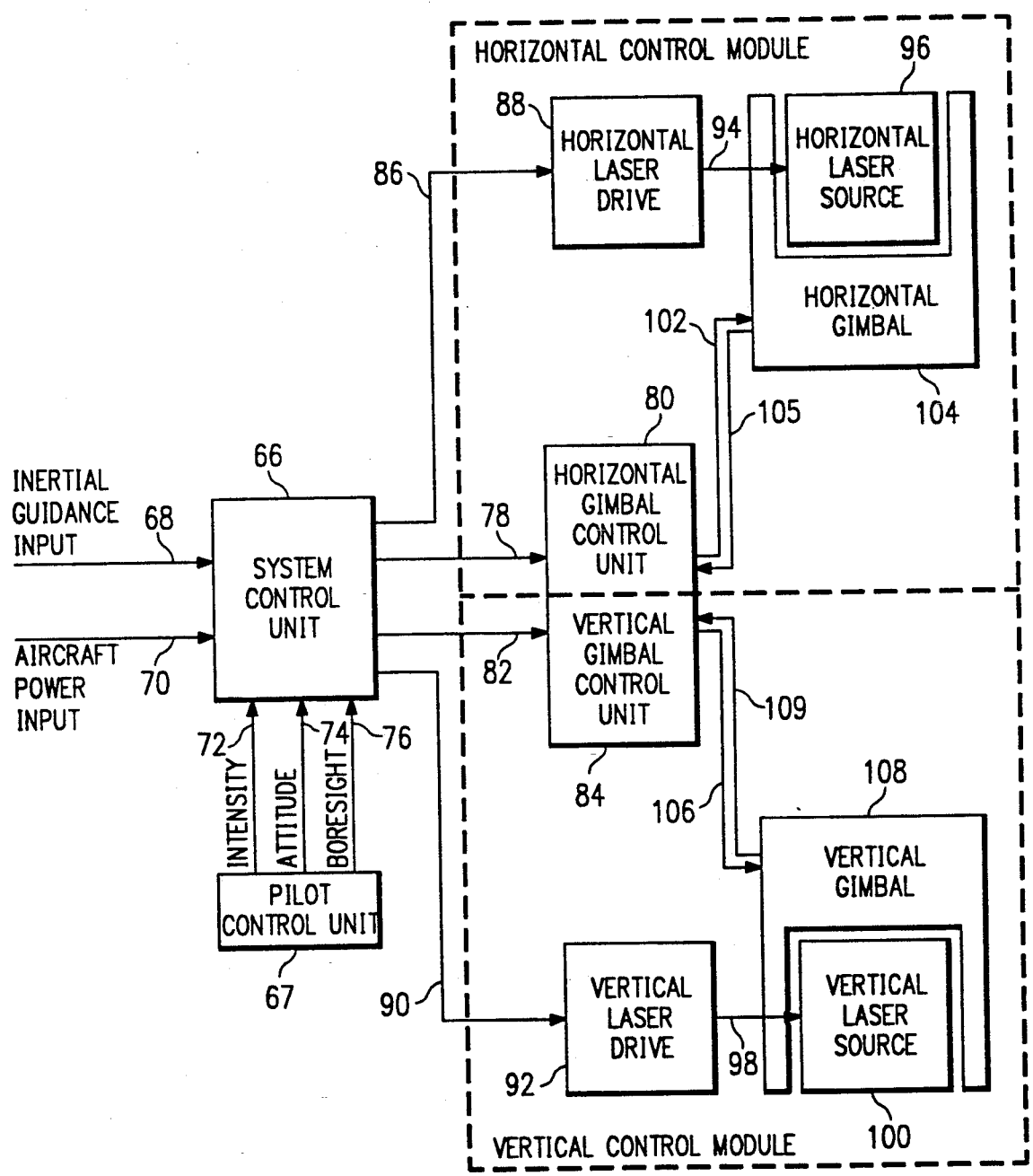
FIG. 5 illustrates a system electrical block diagram of an alternative embodiment of the present invention.

The preferred embodiment of the present invention and its advantages are best understood by referring to FIGS. 1-9 of the drawings, like numerals being used for like and corresponding parts of the various drawings.

FIG. 1 illustrates a side view of a problem addressed by the present invention. In military and other situations, helicopters often fly at high speeds and extremely low altitudes in order to avoid detection by the enemy. Flying at night without lights using night vision goggles compounds the problem by denyinq the pilot the peripheral vision and the horizon reference he normally uses to judge the distance between the helicopter and the ground.

A helicopter 10 in flight above desert terrain 12 reaches a velocity V while heading toward surface 14 having height H above flight path 16 and being continuous with a surface of desert terrain 12. Because the desert terrain is relatively featureless, because the helicopter is flying at a low altitudes, and because night vision goggles usually deny the pilot the stereoscopic vision and horizon information necessary to estimate his distance above the ground, the pilot will not be able to accurately judge the contour of the desert terrain, and may not be able to distinguish upcoming obstacles such as surface 14. To safely avoid surface 14, helicopter 10 must begin avoidance maneuvers at distance DBS away from surface 14.

Distance DBS consists of distance DM and distance DR. Distance DR represents the distance over which helicopter 10 will travel before the pilot can react after becoming aware of surface 14. Thus, distance DR is computed by multiplying helicopter velocity V times a pilot reaction time.

Distance DM represents the distance over which helicopter 10 will travel while maneuvering away from surface 14. Distance DM is a function of radius R and angle A, which define climb path 18. Hence:

DM=(R—H) Tan A, where,
A=Cos$^{-1}$ (R—H)/R, and
where,
R is a function of an ability of helicopter 10 to travel along climb path 18.

In the preferred embodiment, a one second pilot reaction time is assumed, along with a climb path 18 which will exert a force on helicopter 10 not greater than twice the force of Earth's gravity. As can be seen, early awareness of obstacles or of the change in elevation of the terrain allows the pilot to safely avoid collision.

FIGS. 2a–j illustrate use of the present invention to aid the pilot in determining the contour of the terrain surface or of surfaces of other objects in order to safely navigate the helicopter, particularly at high speeds and low altitudes. FIG. 2a shows helicopter 10 approaching surface 14 while in flight over desert terrain 12. An electromagnetic radiation source such as infrared laser 20 projects a horizontal beam 22 substantially parallel to underbelly 24 of helicopter 10. An electromagnetic radiation source such as infrared laser 26 projects a vertical beam 28 downward in the plane substantially parallel to the plane of tail rotor 30. Vertical beam 28 and horizontal beam 22 intersect at beam intersection point 31 in front of helicopter 10 at a distance DBS as described further hereinabove in connection with FIG. 1. The downward angle of the vertical beam is preselected to project a "T" on obstacles or terrain contours located at distance DBS in front of helicopter 10.

Covert operation is achieved by choosing an electromagnetic beam wavelength outside the visible spectrum but within the spectrum of the pilot's goggles. This system gives no visual indication to observers without goggles or to observers with goggles who are outside the projected beam.

FIG. 2b illustrates a substantially elongated vertical line reflection pattern 32 created by vertical beam 28 on surface 14, as viewed from cockpit 34. In FIGS. 2a and 2b, horizontal beam 22 is above the terrain and thus fails to create a horizontal line reflection pattern on surface 14. Thus, the appearance of reflection pattern 32 by itself, as shown in FIG. 2b, indicates helicopter 10 is flying at an altitude above desert terrain 12 sufficient to avoid surface 14.

In FIGS. 2c and 2d, helicopter 10 is at an altitude and distance combination such that horizontal beam 22 creates a substantially elongated horizontal line reflection pattern 36 and vertical beam 28 creates vertical reflection pattern 32 on surface 14 as viewed from cockpit 34. Since vertical reflection pattern 32 is entirely below horizontal reflection pattern 36 as shown in FIG. 2d, helicopter 10 is greater than distance DBS away from surface 14 and therefore is heading toward surface 14 from a safe distance and altitude combination, despite the appearance of horizontal reflection pattern 36.

FIGS. 2e and 2f show helicopter 10 at distance DBS away from surface 14, as demonstrated by vertical reflection pattern 32 forming a "T" with horizontal reflection pattern 36 on surface 14 as viewed from cockpit 34. At this point, the pilot must initiate a ground avoidance maneuver.

In FIG. 2g, helicopter 10 is less than distance DBS away from surface 14, and FIG. 2h shows vertical reflection pattern 32 intersecting horizontal reflection pattern 36 as viewed from cockpit 34. Thus, helicopter 10 is heading toward surface 14 from a dangerous distance and altitude combination, and the pilot should execute evasive maneuvers immediately.

In FIG. 2i, helicopter 10 is less than distance DBS away from surface 14, and FIG. 2j shows vertical reflection pattern 32 is above horizontal reflection pattern 36 as viewed from cockpit 34. Therefore, helicopter 10 is heading toward surface 14 from a very close and extremely dangerous distance and altitude combination. In this instance, helicopter 10 may be unable to avoid surface 14.

In use, the reflection patterns provide information to the pilot concerning not only upcoming obstacles, but also the rate of change of the terrain over which the pilot is flying. Hence, the reflection patterns indicate a contour of a surface. The electromagnetic beams will reflect off the terrain, due to either the angle of attack, or due to aiming the beams slightly downward. As the pilot flies, the reflection patterns will separate or come together responsive to the contour of the terrain surface or of surfaces of other objects. The rate of closure between the beam patterns will give the pilot an intuitive feel for the abruptness of the terrain change. An important characteristic of this invention is that it allows the pilot to assimilate this closure information into his normal flight rhythm without having to avert his attention from his view outside the cockpit. Normally, the pilot will continually maneuver the helicopter to maintain a comfortable separation between reflection patterns 32 and 36. Because the reflection patterns are viewable in the pilot's normal line of sight, use of the reflection patterns quickly becomes second nature to the pilot, allowing the pilot to concentrate on other duties, such as reconnaissance.

Further, the pilot can scan the terrain for obstacles and other potentially dangerous conditions by executing a yaw maneuver and observing the reflection patterns.

FIG. 3 illustrates a front view of an adjustable supporting apparatus of the present invention which may be attached to different helicopters by using different attachment brackets for each helicopter. Alternatively, each laser module may be mounted on the roof or floor of a particular helicopter by individual brackets which are coupled to the structure of helicopter 10. As shown in FIG. 3, electromagnetic radiation source infrared lasers 20 and 26 are coupled to adjustable supporting apparatus 40. Adjustable supporting apparatus 40 is mounted to the side of helicopter 10.

FIG. 4a illustrates a side view of the manually adjustable supporting apparatus 40 of the present invention. Structural pole module 42 is coupled to upper module interface clamp 44 and lower module interface clamp 46. Upper module interface clamp 44 is coupled to vertical laser projector module 48. Lower module interface clamp 46 is coupled to horizontal laser projector module 52. Structural pole module 42 is pivotally coupled to upper mount elevation adjustment 56 around pivot point 65 and is slideably mounted against lower mount elevation adjustment 60 to allow rotation around pivot point 65. Bolts 41 and 43 on lower mount elevation adjustment 60 may be tightened or loosened against respective support bars 59 and 57 to either restrict or allow rotation of structural pole module 42 around pivot point 65. Forward support bar 57 and rear support bar 59 are coupled to opposite ends of upper mount elevation adjustment 56 and to opposite ends of lower mount elevation adjustment 60. Opposite ends of both lower cross bar 61 and upper cross bar 63 are coupled to support bars 57 and 59 such that support bars 61 and 63 are substantially parallel to elevation adjustments 56 and 60.

FIG. 4b illustrates a front view of adjustable supporting apparatus 40 of the present invention. Upper mount elevation adjustment 56 is coupled to helicopter 10 by upper mount 58. Lower mount elevation adjustment 60 is coupled to helicopter 10 by lower mount 62. Wiring harness 64 supplies power and control signals from helicopter 10 to adjustable supporting apparatus 40.

FIG. 5 illustrates a system electrical block diagram of an alternative embodiment of the present invention, wherein horizontal beam 22 and vertical beam 28 are automatically stabilized in response to changes in the orientation of helicopter 10 relative to its direction of flight, such that horizontal beam 22 coincides with the direction of flight of helicopter 10 and a constant distance DBS is maintained. Alternatively, a pilot of helicopter 10 may orient horizontal beam 22 and vertical beam 28 as desired. Thus, horizontal beam 22 and vertical beam 28 may be stabilized in response to a rotation of helicopter 10 around its pitch or yaw axis.

In an exemplary embodiment, horizontal beam 22 is oriented automatically or manually in response to a pitch of helicopter 10 relative to its direction of flight. In order to maintain a constant distance DBS, vertical beam 28 is also oriented appropriately at all times with respect to horizontal beam 22. In another exemplary embodiment, horizontal beam 22 and vertical beam 28 are oriented such that distance DBS is increased in response to higher speeds of helicopter 10 and such that distance DBS is decreased in response to lower speeds of helicopter 10, thereby providing warning times appropriate for various speeds.

In yet another exemplary embodiment, distance DBS is established to correspond with an extremely high speed which helicopter 10 is unlikely to reach, thereby providing a greater margin of safety. In a further exemplary embodiment, beams 22 and 28 are both angled downward with respect to underbelly 24 of helicopter 10 such that a greater margin of altitude safety is achieved.

System control unit 66 can adjustably orient horizontal beam 22 and vertical beam 28 (shown in FIG. 2a), responsive to a pilot control unit 67 or to a velocity component of helicopter 10. Such a velocity component may be detected by an inertial guidance system such as a gyroscope system. A velocity component may comprise rotation around a yaw axis of helicopter 10 or a pitch axis of helicopter 10. A velocity component may also comprise a speed along a yaw axis of helicopter 10, a pitch axis of helicopter 10, or a roll axis of helicopter 10.

In FIG. 5, system control unit 66 receives inertial guidance input 68 from an inertial guidance system. System control unit 66 also receives aircraft power input 70 from helicopter 10. Pilot control unit 67 enables a pilot to control intensity output 72, attitude output 74, and boresight output 76 to system control unit 66. Intensity output 72 controls a brightness level of vertical reflection pattern 32 and horizontal reflection pattern 36 (shown in FIG. 2d). Attitude output 74 controls a degree of forward pitch of horizontal beam 22 relative to helicopter 10. Boresight output 76 controls distance DBS (shown in FIG. 2a) at which vertical beam 28 intersects horizontal beam 22. In alternative embodiments, pilot control unit 67 may also enable a pilot to adjust pitch or yaw of horizontal beam 22 or vertical beam 28 relative to helicopter 10.

System control unit 66 outputs serial data 78 to horizontal gimbal control unit 80, serial data 82 to vertical gimbal control unit 84, intensity control signal 86 to horizontal laser drive 88, and intensity control signal 90 to vertical laser drive 92. Horizontal laser drive 88 outputs an intensity signal 94 to horizontal laser source 96. Vertical laser drive 92 outputs an intensity signal 98 to vertical laser source 100. Horizontal gimbal control unit 80 outputs horizontal gimbal drive shaft signal 102 to horizontal gimbal 104. Horizontal gimbal control unit 80 also inputs horizontal drive shaft reading 105 from horizontal gimbal 104. Vertical gimbal control unit 84 outputs vertical gimbal drive shaft signal 106 to vertical gimbal 108. Vertical gimbal control unit 84 also inputs vertical drive shaft reading 109 from vertical gimbal 108.

In operation, a pilot uses pilot control unit 67 to control intensity output 72. Based on intensity output 72, system control unit 66 outputs intensity control signal 86 to horizontal laser drive 88 and also outputs intensity control signal 90 to vertical laser drive 92. Laser drives 88 and 92 then output respective intensity signals 94 and 98. In this manner, horizontal laser drive 88 and vertical laser drive 92 each control a respective brightness level of horizontal reflection pattern 36 and of vertical reflection pattern 32 (shown in FIG. 2d), as created by horizontal laser source 96 and vertical laser source 100.

If a pilot desires to change the angle of horizontal beam 22 with respect to underbelly 24 of helicopter 10 (as shown in FIG. 2a), then the pilot controls attitude output 74 with pilot control unit 67. Based on attitude output 74, system control unit outputs serial data 78 to horizontal gimbal unit 80 to form the new angle between horizontal beam 22 and underbelly 24. In order to maintain a constant DBS (as shown in FIG. 2a), system control unit 66 also outputs serial data 82 to vertical gimbal control unit 84. To achieve a desired angle in response to serial data 78, horizontal gimbal control unit 80 outputs horizontal gimbal drive shaft signal 102 to horizontal gimbal 104 while referencing horizontal drive shaft reading 105 received from horizontal gimbal 104. Vertical gimbal control unit 84 outputs vertical gimbal drive shaft signal 106 to vertical gimbal 108 while referencing vertical drive shaft reading 109 received from vertical gimbal 108.

If a pilot desires to change distance DBS or to vary the angle of vertical beam 28 with respect to horizontal beam 22, then the pilot uses pilot control unit 67 to control boresight output 76. Based on boresight output 76, system control unit 66 outputs serial data 82 to vertical gimbal control unit 84, which then effects the desired adjustment.

System control unit 66 also receives attitude and boresight signals from inertial guidance input 68. In an alternative embodiment, system control unit 66 receives data from inertial guidance input 68 regarding yaw and pitch of helicopter 10. With yaw and pitch data, system control unit 66 orients horizontal beam 22 and vertical beam 28 to correspond with an orientation of helicopter 10, such that beams 22 and 28 are generally oriented in the direction in which helicopter 10 is moving. Inertial guidance input 68 also provides data to system control unit 66 regarding a speed of helicopter 10. Hence, system control unit 66 may adjust distance DBS responsive to a speed of helicopter 10, such that distance DBS is longer for faster speeds and is shorter for slower speeds.

FIG. 6 illustrates a block diagram of the system control unit 66. Inertial guidance input 68 is provided to inertial guidance interface 110, which outputs elevation position signal 112 and speed adjustment signal 114. Adder 116 combines elevation position signal 112 with attitude output command 74 to produce horizontal beam elevation signal 118. Adder 120 combines horizontal beam elevation signal 118 with speed adjustment signal 114 and boresight output 76 to produce vertical beam elevation signal 122, such that distance DBS is longer for faster speeds and is shorter for slower speeds. Horizontal beam elevation serial data converter 124 receives horizontal beam elevation signal 118 and outputs horizontal beam elevation control data 78 to horizontal beam gimbal control unit 80 (shown in FIG. 5). Vertical beam elevation serial data converter 126 receives vertical beam elevation signal 122 and outputs vertical beam elevation control data 82 to vertical beam gimbal control unit 84 (shown in FIG. 5). Intensity control 128 receives intensity output 72 and outputs intensity control signal 86 to horizontal laser drive 88 (shown in FIG. 5). Intensity control 128 also outputs intensity control signal 90 to vertical laser drive 92 (shown in FIG. 5).

As FIG. 6 illustrates, vertical beam elevation signal 122 comprises horizontal beam elevation signal 118 so that vertical beam 28 may be correspondingly adjusted to maintain a constant distance DBS, as shown in FIG. 2a. However, boresight output 76 or speed adjustment signal 114 may respectively vary distance DBS responsive to pilot control unit 67 (shown in FIG. 5) or to a velocity component of helicopter 10. Similarly, attitude input command 74 allows pilot control unit 67 to adjust a forward pitch angle of horizontal beam 22 relative to helicopter 10, while elevation position signal 112 adjusts horizontal beam 22 responsive to changes in an angle of attack of helicopter 10.

FIG. 7 illustrates a block diagram of the horizontal gimbal control unit 80 and horizontal gimbal 104. Serial elevation control data 78 is received from system control unit 66 (shown in FIG. 5) by serial-to-parallel converter 130, which outputs parallel position command data 132 to digital summing point 134. Digital summing point 134 subtracts drive shaft position 136 from position command data 132 to produce horizontal drive shaft position error signal 102 to stepper motor drive 140. Stepper motor drive 140 inputs horizontal drive shaft position error signal 102 and outputs stepper motor control signal 142, which is input by buffer/driver 144. Buffer/driver 144 outputs stepper motor signal 146 to stepper motor 148, and stepper motor 148 rotates drive shaft 150. Absolute encoder 152 detects a position of drive shaft 150 and sends horizontal drive shaft reading 105 to encoder interface 156. Encoder interface 156 outputs drive shaft position 136 to digital summing point 134, thereby diminishing position error signal 102. This cycle continues until position error signal 102 goes to zero. Vertical gimbal control unit 84 and vertical gimbal 108 (shown in FIG. 5) operate in a manner identical to horizontal gimbal control unit 80 and horizontal gimbal 104.

The vertical and horizontal reflection patterns 32 and 36 shown in FIGS. 2a-j have been found to be very effective in conveying the contour information to the pilot. Different patterns could also be used to distinguish between reflection patterns 32 and 36, such as by periodically blinking one reflection pattern, or by making reflection patterns 32 and 36 to be of different sizes, or by making reflection patterns 32 and 36 to be of different shapes. Also, vertical beam 28 could be offset from horizontal beam 22, rather than intersecting, such that vertical reflection pattern 32 always appears completely to one side of horizontal reflection pattern 36. In this alternative embodiment, if helicopter 10 is distance DBS away from surface 14 as shown in FIG. 2g, then reflection patterns 32 and 36 would appear as shown in FIG. 8 as viewed from cockpit 34.

Figure 9A:
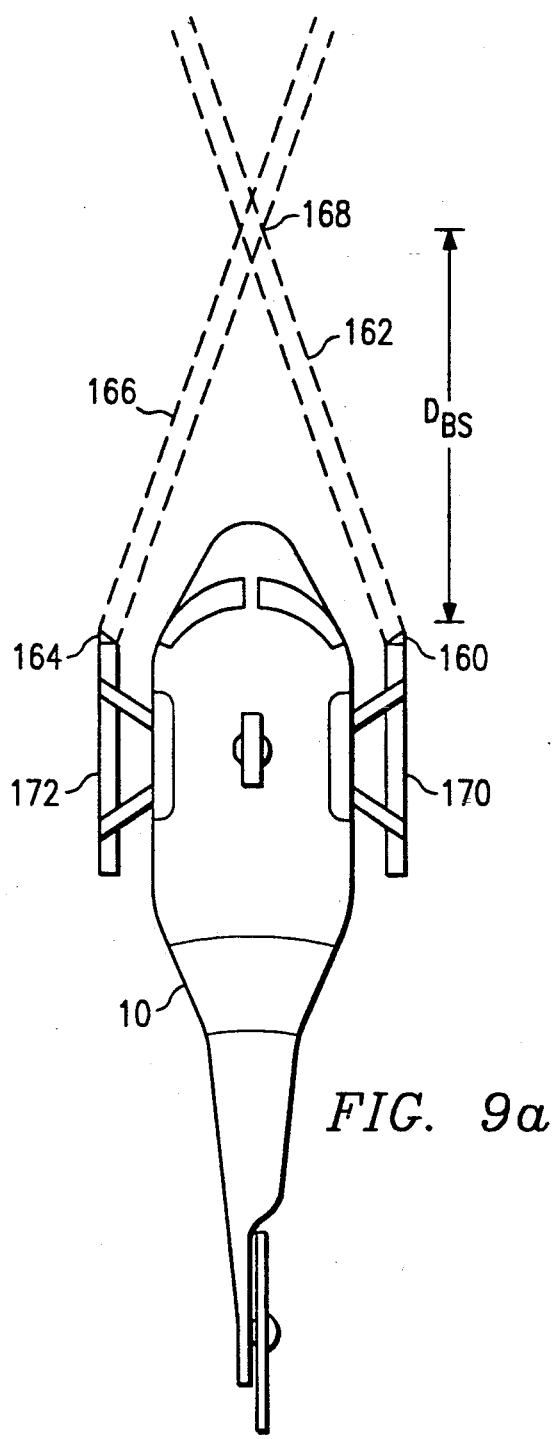
FIGS. 9a-d illustrate perspective views of a helicopter using an alternative embodiment of the present invention and the resulting reflection patterns.

FIG. 9a illustrates a top view of helicopter 10 using an alternative embodiment of the present invention. An electromagnetic radiation source such as infrared laser 160 projects a beam 162 in front of helicopter 10. An electromagnetic radiation source such as infrared laser 164 projects a beam 166 in front of helicopter 10. Beams 162 and 166 intersect at beam intersection point 168 in front of helicopter 10 at a distance DBS as described further hereinabove in connection with FIG. 1. Infrared laser 160 is mounted to skid 170 of helicopter 10. Infrared laser 164 is mounted to skid 172 of helicopter 10.

Figure 9B:
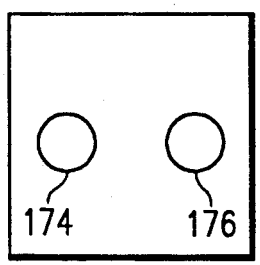
Figure 9C:
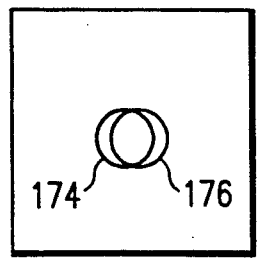
Figure 9D:
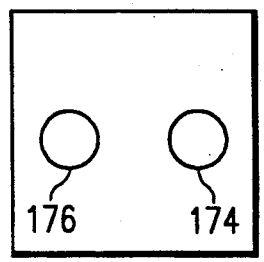

For surfaces of terrain or other obstacles which are greater than distance DBS in front of helicopter 10, beams 162 and 166 create reflection patterns 174 and 176, respectively, as shown in FIG. 9b. For surfaces which are approximately distance DBS in front of helicopter 10, beams 162 and 166 create reflection patterns 174 and 176, respectively, as shown in FIG. 9c. For surfaces Which are less than distance DBS in front of helicopter 10, beams 162 and 166 create reflection patterns 174 and 176, respectively, as shown in FIG. 9d.

If helicopter 10 is sufficiently above the surface of terrain and other obstacles, then beams 162 and 166 may fail to create reflection patterns. Thus, the absence of reflection patterns indicates that helicopter 10 is flying at an altitude sufficient to avoid collision.

The appearance of reflection patterns 174 and 176 as shown in FIG. 9b indicates that helicopter 10 is heading toward a surface but is nevertheless greater than distance DBS away. Thus, helicopter 10 is heading toward the surface from a safe distance and altitude combination.

The appearance of reflection patterns 174 and 176 as shown in FIG. 9c indicates that helicopter 10 is approximately distance DBS away from the surface. Thus, the pilot must initiate an avoidance maneuver.

The appearance of reflection patterns 176 and 174 as shown in FIG. 9d indicates that helicopter 10 is heading toward the surface from a dangerous distance and altitude combination. Thus, the pilot should execute evasive maneuvers immediately.

In an alternative embodiment, different patterns could also be used to further assist the pilot in distinguishing between reflection patterns 174 and 176, such as by periodically blinking one reflection pattern, or by making reflection patterns 174 and 176 to be of different sizes, or making reflection patterns 174 and 176 to be of different shapes.

Although the present invention and its advantages have been described in detail, it should be understood that various changes, substitutions and alterations can be made herein without departing from the spirit and scope of the invention as defined by the appended claims.

What is claimed is:

1. Apparatus for indicating a contour of a surface relative to a vehicle, comprising:
   a first electromagnetic radiation source operable to project a first beam creating a first reflection pattern on the surface, wherein said first reflection pattern has a first shape substantially elongated in a first direction relative to the vehicle;
   a second electromagnetic radiation source operable to project a second beam creating a second reflection pattern on the surface, wherein said second reflection pattern has a second shape substantially elongated in a second direction relative to the vehicle; and
   apparatus for coupling said first and second electromagnetic radiation sources to the vehicle, such that a movement of the vehicle results in a movement of said first and second reflection patterns on the surface in a manner indicative of the contour of the surface.

2. Apparatus for indicating a contour of a surface relative to a vehicle, comprising:
   a first electromagnetic radiation source operable to project a first beam creating a first reflection pattern on the surface, wherein said first reflection pattern has a first shape substantially elongated in a vertical direction relative to the vehicle;
   a second electromagnetic radiation source operable to project a second beam creating a second reflection pattern on the surface, wherein said second reflection pattern has a second shape substantially elongated in a horizontal direction relative to the vehicle; and
   apparatus for coupling said first and second electromagnetic radiation sources to the vehicle, such that a movement of the vehicle results in a movement of said first and second reflection patterns on the surface in a manner indicative of the contour of the surface.

3. The apparatus of claim 2 wherein a safe movement of the vehicle is indicated by an appearance relative to the vehicle of said second reflection pattern above said first reflection pattern.

4. Apparatus for indicating a contour of a surface relative to a vehicle, comprising:
   a first electromagnetic radiation source operable to project a first beam creating a first reflection pattern on the surface;
   a second electromagnetic radiation source operable to project a second beam creating a second reflection pattern on the surface, wherein said first reflection pattern has a shape different from said second reflection pattern; and
   apparatus for coupling said first and second electromagnetic radiation sources to the vehicle, such that a movement of the vehicle results in a movement of said first and second reflection patterns on the surface in a manner indicative of the contour of the surface.

5. Apparatus for indicating a contour of a surface relative to a vehicle, comprising:
   a first electromagnetic radiation source operable to project a first beam creating a first reflection pattern on the surface;
   a second electromagnetic radiation source operable to project a second beam creating a second reflection pattern on the surface, wherein said first reflection pattern has a size different from said second reflection pattern; and
   apparatus for coupling said first and second electromagnetic radiation sources to the vehicle, such that a movement of the vehicle results in a movement of said first and second reflection patterns on the surface in a manner indicative of the contour of the surface.

6. Apparatus for indicating a contour of a surface relative to a vehicle, comprising:
   a first electromagnetic radiation source operable to project a first beam creating a first reflection pattern on the surface;
   a second electromagnetic radiation source operable to project a second beam creating a second reflection pattern on the surface; and
   apparatus for adjustably orienting said first and second beams relative to the vehicle responsive to an input by a pilot of the vehicle, such that a movement of the vehicle results in a movement of said first and second reflection patterns on the surface in a manner indicative of the contour of the surface.

7. Apparatus for indicating a contour of a surface relative to a vehicle, comprising:
   a first electromagnetic radiation source operable to project a first beam creating a first reflection pattern on the surface;
   a second electromagnetic radiation source operable to project a second beam creating a second reflection pattern on the surface; and
   apparatus for adjustably orienting said first and second beams relative to the vehicle response to a velocity component of the vehicle, such that a movement of the vehicle results in a movement of said first and second reflection patterns on the surface in a manner indicative of the contour of the surface.

8. The apparatus of claim 7 wherein said velocity component is detected by an inertial guidance system.

9. The apparatus of claim 7 wherein said velocity component is a rotation around a yaw axis of the vehicle.

10. The apparatus of claim 7 wherein said velocity component is a rotation around a pitch axis of the vehicle.

11. The apparatus of claim 7 wherein said velocity component is a speed along a yaw axis of the vehicle.

12. The apparatus of claim 7 wherein said velocity component is a speed along a pitch axis of the vehicle.

13. The apparatus of claim 7 wherein said velocity component is a speed along a roll axis of the vehicle.

14. Apparatus for indicating a contour of a surface relative to an aircraft, comprising:
   a first infrared beam creating a first reflection pattern on the surface having a first shape substantially elongated in a first direction relative to the aircraft;
   a second infrared beam creating a second reflection pattern on the surface having a second shape substantially elongated in a second direction relative to the aircraft; and
   apparatus for aligning said first and second infrared beams to intersect at a relevant distance from the aircraft, such that a movement of the aircraft results in a movement of said first and second reflection patterns on the surface in a manner indicative of the contour of the surface.

15. A method for indicating a contour of a surface relative to a vehicle, comprising the steps of:
projecting a first beam from a first electromagnetic radiation source to create a first reflection pattern on the surface;
projecting a second beam from a second electromagnetic radiation source to create a second reflection pattern on the surface;
maintaining said first reflection pattern in a first shape substantially elongated in a first direction relative to the vehicle;
maintaining said second reflection pattern in a second shape substantially elongated in a second direction relative to the vehicle; and
coupling said first and second electromagnetic radiation sources to the vehicle, such that a movement of the vehicle results in a movement of said first and second reflection patterns on the surface in a manner indicative of the contour of the surface.

16. The method of claim 15 wherein said step of maintaining said first reflection pattern comprises the step of maintaining said first reflection pattern in a vertical direction relative to the vehicle and wherein said step of maintaining said second reflection pattern comprises the step of maintaining said second reflection pattern in a horizontal direction relative to the vehicle.

17. The method of claim 16 and further comprising the step of indicating a safe movement of the vehicle by an appearance relative to the vehicle of said second reflection pattern above said first reflection pattern.

18. A method for indicating a contour of a surface relative to a vehicle, comprising the steps of:
projecting a first beam from a first electromagnetic radiation source to create a first reflection pattern on the surface;
projecting a second beam from a second electromagnetic radiation source to create a second reflection pattern on the surface;
maintaining said first reflection pattern in a shape different from said second reflection pattern; and
coupling said first and second electromagnetic radiation sources to the vehicle, such that a movement of the vehicle results in a movement of said first and second reflection patterns on the surface in a manner indicative of the contour of the surface.

19. A method for indicating a contour of a surface relative to a vehicle, comprising the steps of:
projecting a first beam from a first electromagnetic radiation source to create a first reflection pattern on the surface;
projecting a second beam from a second electromagnetic radiation source to create a second reflection pattern on the surface;
maintaining said first reflection pattern in a size different from said second reflection pattern; and
coupling said first and second electromagnetic radiation sources to the vehicle, such that a movement of the vehicle results in a movement of said first and second reflection patterns on the surface in a manner indicative of the contour of the surface.

20. A method for indicating a contour of a surface relative to a vehicle, comprising the steps of:
projecting a first beam from a first electromagnetic radiation source to create a first reflection pattern on the surface;
projecting a second beam from a second electromagnetic radiation source to create a second reflection pattern on the surface; and
adjustably orienting said first and second beams relative to the vehicle responsive to an input by a pilot of the vehicle, such that a movement of the vehicle results in a movement of said first and second reflection patterns on the surface in a manner indicative of the contour of the surface.

21. A method for indicating a contour of a surface relative to a vehicle, comprising the steps of:
projecting a first beam from a first electromagnetic radiation source to create a first reflection pattern on the surface;
projecting a second beam from a second electromagnetic radiation source to create a second reflection pattern on the surface; and
adjustably orienting said first and second beams relative to the vehicle responsive to a velocity component of the vehicle, such that a movement of the vehicle results in a movement of said first and second reflection patterns on the surface in a manner indicative of the contour of the surface.

22. The method of claim 21 and further comprising the step of detecting said velocity component with an inertial guidance system.

23. A method for indicating a contour of a surface relative to an aircraft, comprising the steps of:
projecting a first infrared beam to create a first reflection pattern on the surface having a first shape substantially elongated in a first direction relative to the aircraft;
projecting a second infrared beam to create a second reflection pattern on the surface having a second shape substantially elongated in a second direction relative to the aircraft; and
aligning said first and second infrared beams to intersect at a relevant distance from the aircraft, such that a movement of the aircraft results in a movement of said first and second reflection patterns on the surface in a manner indicative of the contour of the surface.

* * * * *